UNITED STATES PATENT OFFICE.

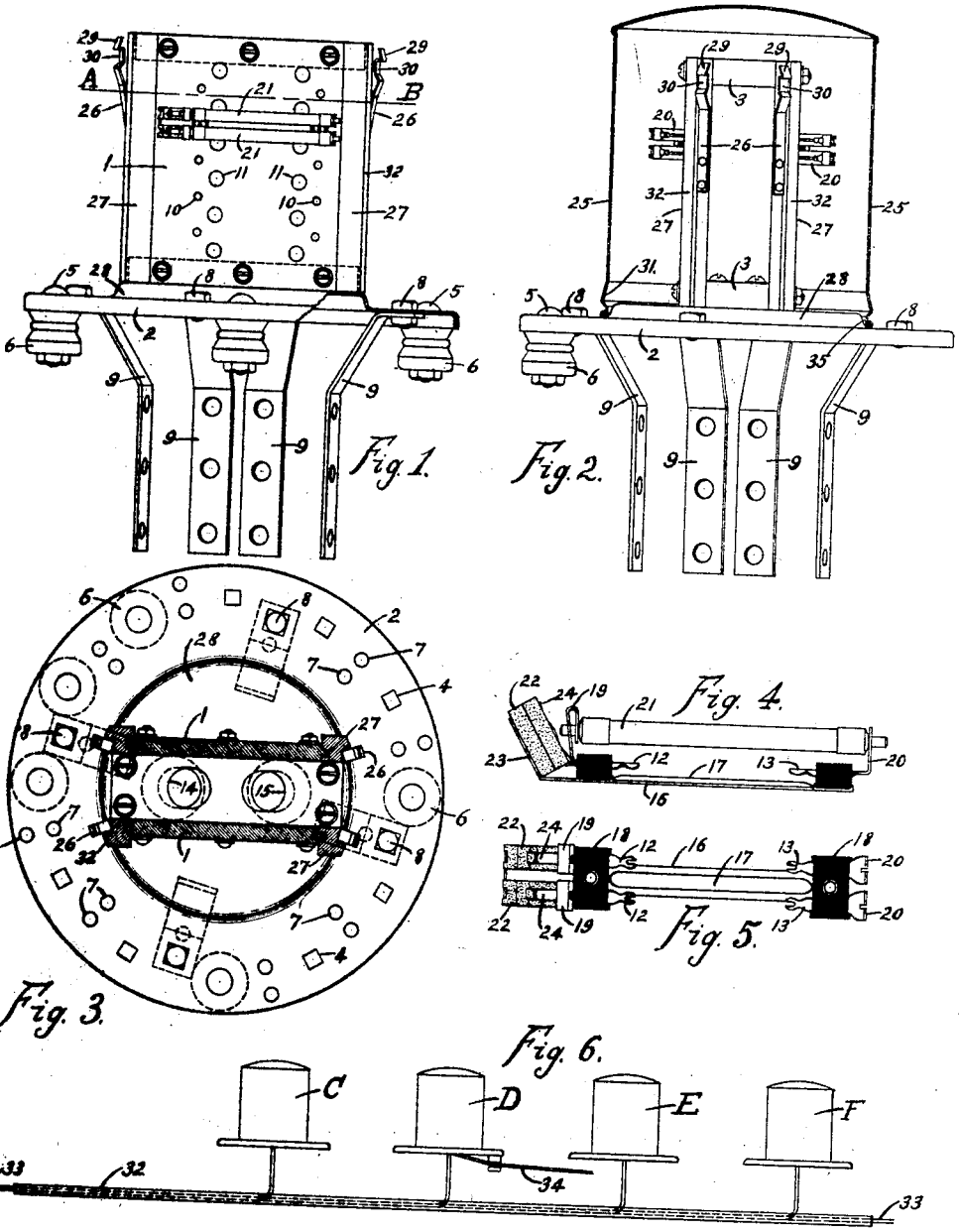

FRANK B. COOK, OF CHICAGO, ILLINOIS

CABLE-TERMINAL AND SYSTEM OF PROTECTION.

No. 862,542.   Specification of Letters Patent.   Patented Aug. 6, 1907.

Application filed January 18, 1906. Serial No. 296,714.

*To all whom it may concern:*

Be it known that I, FRANK B. COOK, a citizen of the United States of America, and a resident of the city of Chicago, in the State of Illinois, have invented a new and useful Cable-Terminal and System of Protection, of which the following is a specification, reference being had to the accompanying drawings illustrating same.

My invention relates to cable terminals such as are used on telephone and telegraph poles at the ends of aerial cables, to provide distribution and protection therefor, my object being, first, to provide a terminal which is more suitable for multiple distribution than terminals heretofore used; second, to provide a terminal on which the protective apparatus may be mounted in units as desired, either singly or up to the capacity of the terminal; third, to provide an improved protector to be mounted on the terminal; fourth, to provide improved means for supporting the cover of the terminal; fifth, to provide improved means for leading off the drop-wires from the terminal; sixth, to provide improved means for mounting the terminal to a pole; and seventh, to provide an improved system of multiple distribution, which furnishes complete protection for the cables and which is much more economical than such systems heretofore used.

In telephone systems of considerable size, it is considered the best practice nowadays to use a system of multiple distribution for the cables. This system of distributing each pair of wires at a number of points, makes the system very pliable and affords numerous advantages in the operation and utilization thereof.

It has been the practice, heretofore, to provide a terminal at each point of distribution of a cable and to equip each terminal complete with protection for all the lines which are distributed at each point. As a certain pair of wires in a cable is generally used at one point only, at any given time, it will be readily seen that the protection on this pair of wires, at the various points of distribution, is used at one point only, at any given time, that at the other points of distribution being out of service. If it is desired to use this pair of wires at another point of distribution, the protection at this latter point is then used, that at the other points being out of service. Consequently, in such a system, it is necessary to provide several times the amount of protection that is used at any given time on the system.

In my present invention, I have devised a cable terminal particularly adapted for use on multiple-distribution systems, which comprises a blank terminal, without protection, and which is adapted to have the protection mounted thereon, in units, at any time either before or after the terminal is installed. With this arrangement, I can distribute a cable in multiple, at several different points, and use protection for each pair of the wires distributed, at one point only, where the pair is to be carried off to the drop-wires. If it is desired to change the drop-wires on a certain pair, from one point of distribution to another, the protector unit is also changed from the one point of distribution to the other, along with the drop-wires.

It will readily be seen that in my system the protection used is no more than the protection used on a system without multiple distribution, and that all of the features of a multiple-distribution system are provided.

I will more particularly describe my invention by reference to the accompanying drawings, in which,—

Figure 1 is a side elevation of the cable terminal of the invention, showing a single pair of protectors mounted thereon; Fig. 2 is an edge elevation of the cable terminal of Fig. 1, showing the cover therefor in cross-section, and pairs of protectors mounted on opposite sides thereof, respectively; Fig. 3 is a plan view of Fig. 1, with a portion shown in cross-section taken on line A—B of Fig. 1, and with the protectors removed; Fig. 4 is a side elevation of the protector unit adapted to be mounted on the terminal; Fig. 5 is a plan view of Fig. 4, with the inclosed fuses removed, and Fig. 6 is a diagram of a system of multiple distribution, showing a number of terminals on the system and a pair of drop-wires leading from one of the terminals, from a pair of wires which is distributed at the several terminals on the system.

Like characters refer to like parts in the several figures.

The protector unit of Figs. 4 and 5 forms the subject matter of my copending application Serial No. 356,881, filed February 11, 1907, which is a division of this present application.

Upright pieces 1, 1, preferably of wood, are suitably mounted on a circular supporting disk 2, with distance pieces 3, 3 secured therebetween, preferably as shown. The circular disk 2 is provided with holes 4, 4 therein adapted to receive bolts 5, 5, which secure insulators 6, 6 in place, and with holes 7, 7 adapted to receive bolts 8, 8, which secure mounting brackets 9, 9 for the terminal, in place, preferably as shown. The insulators 6, 6 may be mounted in a continuous row around the disk 2 or promiscuously therearound as shown in Fig. 3. Insulators 6, 6 are for supporting the drop-wires which lead from the terminal to the sub-stations of the system. Mounting brackets 9, 9 may be secured to the plate 2 at any of the holes 7, 7, either close to the outer edge of plate 2, or more towards the center thereof, to enable them to fit different sizes of poles. These holes 7, 7 are spaced preferably as shown in Fig. 3, for the purpose of giving this variation to the mounting brackets 9, 9. Each side-portion 1, of the terminal is provided with small screw holes 10, 10 therein, which are adapted to receive suitable screws for securing the protector units, shown in Figs. 4 and 5, in place. Each side portion 1 is also provided with holes 11, 11 therein adapted to receive the circuit conductors which extend from the connection terminals 12 and 13 of the protector units, through the said side pieces 1, 1 to the inner portion of the terminal, and through suitable holes 14 and 15 in the bottom distance piece 3 and the circular disk 2.

The protector unit of Figs. 4 and 5 preferably comprises a sheet-metal supporting strip 16, ribbed as at 17 to stiffen same and to which are mounted suitable insulating blocks 18, 18, preferably of hard rubber. The fuse clamping springs 19 and 20 are preferably secured to the hard rubber blocks 18, 18 by being forcibly inserted through holes therein, preferably as shown, which construction holds the springs 19 and 20 very rigidly. In closed fuses 21, 21 are suitably pressed in place in the springs 19 and 20, preferably as shown. Lightning arresters 22, 22 are suitably supported between a bent-up portion 23 of the base strip 16, and contact springs 24, 24. Insulating blocks 18, 18 are preferably riveted to the base strip 16 by hollow rivets which receive the screws for securing the protector unit to the terminal at 10, 10.

The terminal cover 25 is preferably cylindrical in form and is preferably made of galvanized sheet metal. Supporting springs 26, 26, preferably four in number, are carried by four corner pieces 27, 27, preferably of wood, which are secured to the side pieces 1, 1 of the terminal, preferably as shown. The terminal cover 25 is made just large enough to fit over the circular projection 28 of the plate 2, when it is pulled down in place over the terminal as shown in Fig. 2. The springs 26, 26 are preferably provided with a projection 29 and a notch 30 thereon which fit the V-shaped groove 31 and the rim 35 of the cover 25 when the same is lifted to the top of the terminal. Whatever the position of the cover with respect to the terminal, whether raised partially or clear to the top of the terminal, the springs 26, 26 always press out against the cover and firmly hold same in place. The corner pieces 27, 27 are beveled as at 32, to form guides for the cover 25. The cover 25, if raised to the top of the terminal so as to give access to all of the protective devices, will be firmly held in such position by the springs 26, 26 catching in the V-shaped groove 31 of the cover so that the latter cannot be readily pulled clear off of the terminal and dropped to the ground. If, however, it is desired to entirely remove the cover 25, the springs 26, 26 may be pressed inwardly which allows the projections 29, 29 to escape the V-shaped groove 31 and the cover to be readily removed.

In Fig. 6, 32 represents a cable and 33 a pair of wires therein which are distributed in multiple at the several terminals C, D, E and F of the system. In the system illustrated, the conductors 33 are used at terminal D from which the drop-wires 34 lead to a sub-station of the system; but are distributed also at terminals C, E and F so that the drop-wires 34 may be changed from terminal D to any of the other terminals if desired. In this system, where my cable terminals are used, the protector unit for the pair of wires 33, would be mounted on terminal D, the other terminals being blank for this pair of wires. Should the drop-wires 34 be changed from terminal D to terminal F, the protector unit for this pair of wires at terminal D would also be changed from terminal D to terminal F. This system of protection may be employed for all of the conductors of the cable, thereby giving a very pliable arrangement for the distribution and a very efficient and economical arrangement for the protection.

While I have herein illustrated one particular form of this invention, I do not wish to limit myself to the exact details as herein shown, minor changes in which would not be a departure from the scope of the invention.

Having thus described my invention, what I claim as new and desire to secure by Letters Patent, is—

1. A cable terminal of the character described, comprising a circular base plate, substantially flat protector mounting strips mounted vertically on the said base plate and parallel with space between throughout their extent, series of holes in the said strips for accommodating conductors leading therethrough to protective devices, brackets secured to the underneath side of the base plate and arranged to be mounted around the top of a pole, insulators secured around the underneath side of the base plate for carrying drop conductors, and individual protector units adapted to be mounted singly on the said strips at any time during the use of the terminal.

2. A cable terminal comprising a circular base plate substantially flat protector mounting strips mounted vertically on the said base plate with space between throughout their extent, suitable means for mounting the base plate to a pole, series of holes through the said strips through which cable conductors and aerial conductors extend and are held in distribution thereby, and individual protector units adapted to be mounted singly on the said side portions to be connected to the various conductors as desired.

3. A cable terminal, means for mounting same to a pole, a cylindrical cover for the terminal, a groove formed around the open end of the cover, suitable springs carried by the terminal and formed so as to fit the said groove when the cover is raised to expose the terminal head, and suitable guides for the cover, the said springs pressing out against the cover to firmly hold same in place in whatever position it may be placed.

4. A cable terminal, a circular sheet-metal base plate therefor upon which the terminal is mounted, suitable insulators mounted around the edge of the said base plate and vertically arranged sheet metal strips secured to the underneath side of the said base plate and adapted to fit over the top of a pole to be secured thereto to support the terminal in place.

5. A cable terminal, a circular base therefor to which the terminal is mounted, suitable vertical brackets secured to the said base and adapted to be secured around the top of a pole, and suitable holes in the said base spaced so as to give the said brackets various mountings to enable them to fit different sizes of poles.

6. A cable terminal comprising a suitable base, parallel sides mounted on the base, four upright corner posts secured to the respective edges of the parallel sides, a leaf spring carried by each of the said posts and adapted to normally spring outward past the post, a cylindrical sheet-metal cover for the terminal placed over same so that the springs bear against the inner surface of the cover to hold same in place, a groove around the said cover near the bottom end thereof, and projections on the said springs adapted to fit in the said groove when the cover is raised.

7. A cable terminal comprising a circular base plate, protector mounting strips mounted vertically on the said base plate, holes through the base-plate near the center to accommodate a cable and aerial conductors leading to the terminal, series of holes through the said protector mounting strips for accommodating the cable conductors and aerial conductors and holding same in distribution, and individual protector units adapted to be mounted singly in rows on each of the said protector mounting strips to be connected to the said cable conductors and aerial conductors, for purposes substantially as described.

As inventor of the foregoing, I hereunto subscribe my name in the presence of two subscribing witnesses, this 15th day of January, 1906.

FRANK B. COOK.

Witnesses:
   FREDERICK R. PARKER,
   JNO. F. TOMPKINS.